United States Patent [19]

Mouri

[11] Patent Number: 5,314,158
[45] Date of Patent: May 24, 1994

[54] POWERED SEAT SLIDE DEVICE

[75] Inventor: Takayuki Mouri, Kanagawa, Japan

[73] Assignee: Ikeda Bussan Co., Ltd., Ayase, Japan

[21] Appl. No.: 936,643

[22] Filed: Aug. 28, 1992

[30] Foreign Application Priority Data

Aug. 30, 1991 [JP] Japan .................................. 3-76754

[51] Int. Cl.⁵ .............................................. F16M 13/00
[52] U.S. Cl. .................................... 248/429; 74/89.15
[58] Field of Search ............... 248/430, 429, 424, 420; 296/65.1; 74/89.15

[56] References Cited

U.S. PATENT DOCUMENTS

| | | | |
|---|---|---|---|
| 4,802,374 | 2/1989 | Hamelin et al. | 74/89.15 X |
| 4,872,903 | 10/1989 | Periou | 74/89.15 |
| 5,048,786 | 9/1991 | Tanaka et al. | 248/429 |
| 5,048,886 | 9/1991 | Ito et al. | 248/430 X |
| 5,125,611 | 6/1992 | Cox | 248/429 |
| 5,150,872 | 9/1992 | Isomura | 248/429 |

Primary Examiner—Ramon O. Ramirez
Attorney, Agent, or Firm—Foley & Lardner

[57] ABSTRACT

An automotive powered seat slide device including upper and lower guide rails, slidably fitted to each other, such that the position of the seat relative to the floor is adjusted frontwardly and rearwardly, includes a driving mechanism having a driven connection with an electric motor and a screw-threaded shaft rotatably mounted on the upper rail in an aperture defined in the slidably fitted pair of rails and a nut member engaged with the screw-threaded shaft and rigidly mounted on the lower rail for rotation relative to the screw-threaded shaft. One end of the screw-threaded shaft is rotatably supported by the upper rail, the other end of the screw-threaded shaft is constructed as a free end so as to permit a proper flexibility of the screw-threaded shaft. An elastomeric mass is also attached to the free end of the screw-threaded shaft, so as to prevent a direct contact between the free end and the inner wall of at least one of the upper and lower rails and to achieve an exact dynamic balance of the screw-threaded shaft.

3 Claims, 4 Drawing Sheets 5,314,158

POWERED SEAT SLIDE DEVICE

BACKGROUND OF THE INVENTION

1. Field of the Invention

The present invention relates to a powered seat slide device, such as a motor-driven seat slide device for an automotive vehicle, and particularly to a powered seat slide device employing at least one pair of guide rails, namely an upper slidable guide rail firmly secured to the bottom surface of the automobile seat and a lower stationary guide rail rigidly mounted on the floor panel of the vehicle body, which is capable of electronically adjusting the position of the automobile seat assembly in a direction generally parallel to the longitudinal direction of the vehicle body.

2. Description of the prior Art

Recently, there have been disclosed and developed various powered seat slide devices which can adjust the relative displacement between upper and lower seat rails. A conventional automotive powered seat slide device traditionally employs a telescopically extendable guide rail structure for each side of the seat assembly. The telescopically extendable guide rail structure is usually interposed between the seat cushion and the floor panel of the vehicle.

Referring now to FIG. 1, there is shown a prior art powered seat slide device for automotive vehicles. The telescopically extendable guide rail structure is comprised of a lower stationary guide rail 60 rigidly mounted on the floor panel of the vehicle body, and an upper guide rail 61 firmly secured to a respective side portion of the base plate of the seat. As is generally known, the upper guide rail 61 is slidably fitted to the lower guide rail 60. The powered seat slide device also includes a guide rail drive mechanism comprised of a gear box 64 including a worm having a driven connection with a drive shaft of a drive motor (not shown) and a worm wheel having external threads meshed with the worm. The gear box 64 serves as a reduction gear for reducing revolutions of the output shaft of the motor and increasing rotation torque created by the motor. As clearly seen in FIG. 1, a screw-threaded shaft 62 is also provided in an aperture defined between the slidably fitted pair of rails 60 and 61. The worm wheel is rigidly formed integral with the screw-threaded shaft 62. The screw-threaded shaft 62 engages with a nut member 63 fixed onto the bottom wall section of the lower stationary guide rail 60 by means of fasteners, such as bolts, so as to prevent both rotational movement and sliding movement of the nut member 63 relative to the lower guide rail 60. Conventionally, the front end (viewing FIG. 1) of the screw-threaded shaft 62 is rotatably supported by bearings provided on the gear box 64, while the rear end of the screw-threaded shaft 62 is rotatably supported by a radial bearing 65 firmly suspended by the upper guide rail 61. In the previously noted conventional powered seat slide devices, since the screw-threaded shaft 62 is rotatably supported at three portions, namely the front end, the substantially center, portion and the rear end, such an arrangement of the screw-threaded shaft 62 requires an excessively precise alignment matching between the bearings of the gear box 64, the nut member 63, and the rear end bearing 65. Supposing that at least one of the above noted bearings and the nut member is offset from a predetermined installation position, there is a tendency for the three supported portions of the screw-threaded shaft 62 to be slightly misaligned with each other. Furthermore, since the upper and lower guide rails 61 and 60 are generally formed by pressing, so as to lighten the entire weight of the guide rail assembly, each guide rail having a relatively low rigidity tends to be slightly deformed by a load applied thereto. Ideally, each supported portion of the screw-threaded shaft 62 must be in alignment with each other. With the previously noted conventional supporting structure of the screw-threaded shaft 62, the respective supported portions of the screw-threaded shaft 62 thus tend to be misaligned with each other, during assembling or after assembling the powered seat slide device on the vehicle body. If the supported portions of the screw-threaded shaft 62 are slightly misaligned with each other, smooth rotation of the screw-threaded shaft 62 is prevented due to undesirable load applied to each supported portion. The screw-threaded shaft 62 vibrates depending on the magnitude of misalignment of the respective supported portions thereof. The greater the misalignment of the respective supported portions of the screw threaded shaft 62 becomes, the greater the amplitude of vibration of the shaft 62. The amplified vibration of the shaft 62 causes undesirable noise. With energy loss resulting from the increased noise, the motor speed fluctuates irregularly. Consequently, the motor employed in the conventional powered seat slide device has an increased tendency to become overloaded due to misalignment between front, middle, and rear supported portions of the screw-threaded shaft 62. This results in a low durability of the device.

SUMMARY OF THE INVENTION

It is, therefore, in view of the above disadvantages, an object of the present invention to provide a powered seat slide device employing at least one pair of guide rails slidably fitted to each other for slidably supporting a seat such that the position of the seat relative to a floor is adjusted frontwardly and rearwardly through a driving mechanism including a screw-threaded shaft rotatably supported by either one of the guide rails and a nut member engaged with the screw-threaded shaft and rigidly mounted on the other guide rail for rotation relative to the screw-threaded member, which can provide a smooth and high torque transmission from the drive motor to the screw-threaded shaft, while reducing the magnitude of undesirable load applied to the screw-threaded shaft.

It is another object of the invention to provide a powered seat slide device employing a drive motor, a gear box, at least one pair of guide rails being comprised of an upper slidable guide rail firmly secured to the bottom surface of a seat and a lower stationary guide rail rigidly mounted on a floor panel, and a driving mechanism including a screw threaded shaft rotatably supported by either one of the guide rails and a nut member engaged with the screw-threaded shaft and rigidly mounted on the other guide rail for rotation relative to the screw-threaded member, which can reliably prevent the drive motor from being overloaded during operation of the device, while attenuating the magnitude of vibration of the driving mechanism, resulting from a slight misalignment between a plurality of rotatably supported portions of the screw-threaded shaft, namely a front shaft end rotatably supported by bearings attached to the gear box, an intermediate shaft section screwed into the nut member, and a rear shaft end rotatably supported by a radial bearing attached to a rear end of the guide rail from which the gear box is suspended.

It is a further object of the invention to provide a powered seat slide device having a high durability.

It is a still further object of the invention to provide a powered seat slide device which can effectively reduce a level of noise created during operation of the device.

In order to accomplish the aforementioned and other objects, a powered seat slide device including at least one pair of guide rails slidably fitted to each other, for slidably supporting a seat such that the position of the seat relative to a floor is adjusted frontwardly and rearwardly, comprises a driving mechanism having a driven connection with a drive motor, for causing a relative sliding movement of one of the guide rails to the other, the driving mechanism including a screw-threaded shaft rotatably mounted on either one of the guide rails in an aperture defined in the slidably fitted pair of guide rails and a nut member engaged with the screw-threaded shaft and rigidly mounted on the other guide rail for rotation relative to the screw-threaded shaft, and one end of the screw-threaded shaft being rotatably supported by the one of guide rails, the other end of the screw-threaded shaft being a free end so as to permit a proper flexibility of the screw-threaded shaft.

According to another aspect of the invention, a powered seat slide device including at least one pair of guide rails slidably fitted to each other, for slidably supporting a seat such that the position of the seat relative to a floor is adjusted frontwardly and rearwardly, comprises a driving mechanism having a driven connection with a drive motor, for causing a relative sliding movement of one of the guide rails to the other, the driving mechanism including a screw-threaded shaft rotatably mounted on either one of the guide rails in an aperture defined in the slidably fitted pair of guide rails and a nut member engaged with the screw-threaded shaft and rigidly mounted on the other guide rail for rotation relative to the screw-threaded shaft, one end of the screw-threaded shaft being rotatably supported by the one of guide rails, the other end of the screw-threaded shaft being a free end so as to permit a proper flexibility of the screw-threaded shaft, and an elastomeric mass attached to the free end of the screw-threaded shaft, so as to attenuate undesirable noise caused by the interference between the free end and the inner wall of at least one of the guide rails.

The elastomeric mass is preferably comprised of a substantially cylindrical elastomeric member coaxially arranged with the screw-threaded shaft, so as to achieve a predetermined acceptable dynamic balance of the screw-threaded shaft. It is preferable that the cylindrical elastomeric member is spaced apart from the inner wall surfaces of the slidably fitted pair of guide rails by a predetermined identical distance, each inner wall surface being opposite to the outer peripheral surface of the cylindrical elastomeric member. The elastomeric mass is set to a predetermined weight mass to serve as a balancer for suppressing flutter of the free end of the screw-threaded shaft, during operation of the device.

DESCRIPTION OF THE PREFERRED EMBODIMENTS

Figure 1:
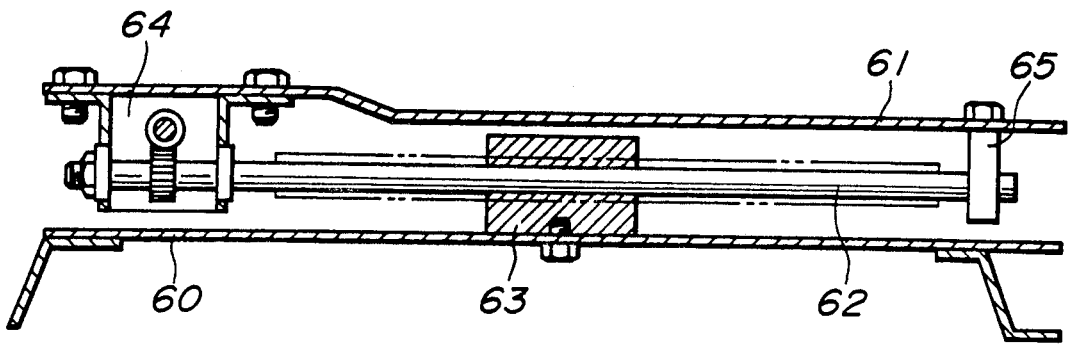
FIG. 1 is a longitudinal cross-sectional view mainly illustrating a driving mechanism of a conventional powered seat slide device.
Figure 2:
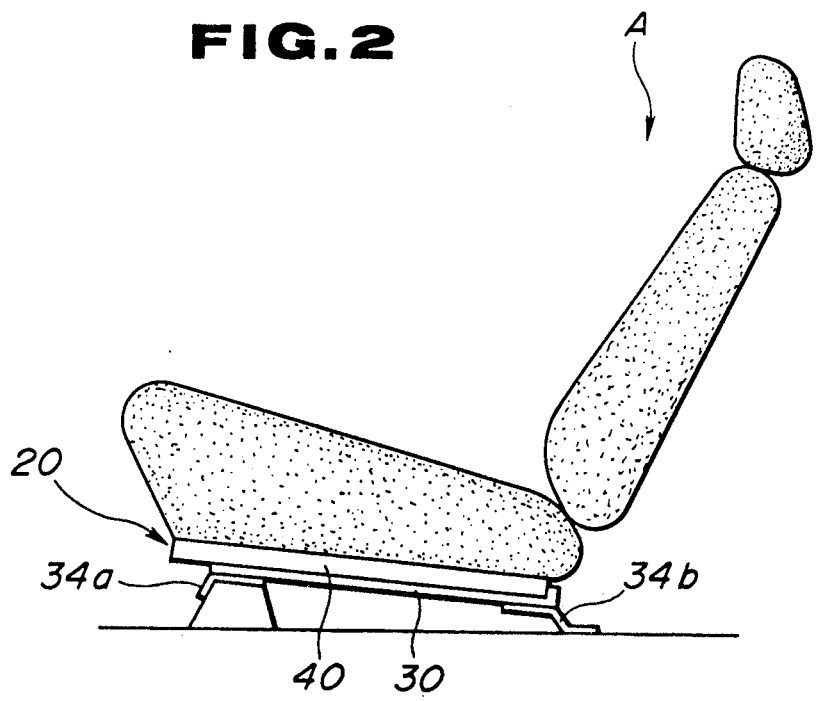
FIG. 2 is a side view illustrating a seat assembly employing a powered seat slide device according to the invention.
Figure 3:
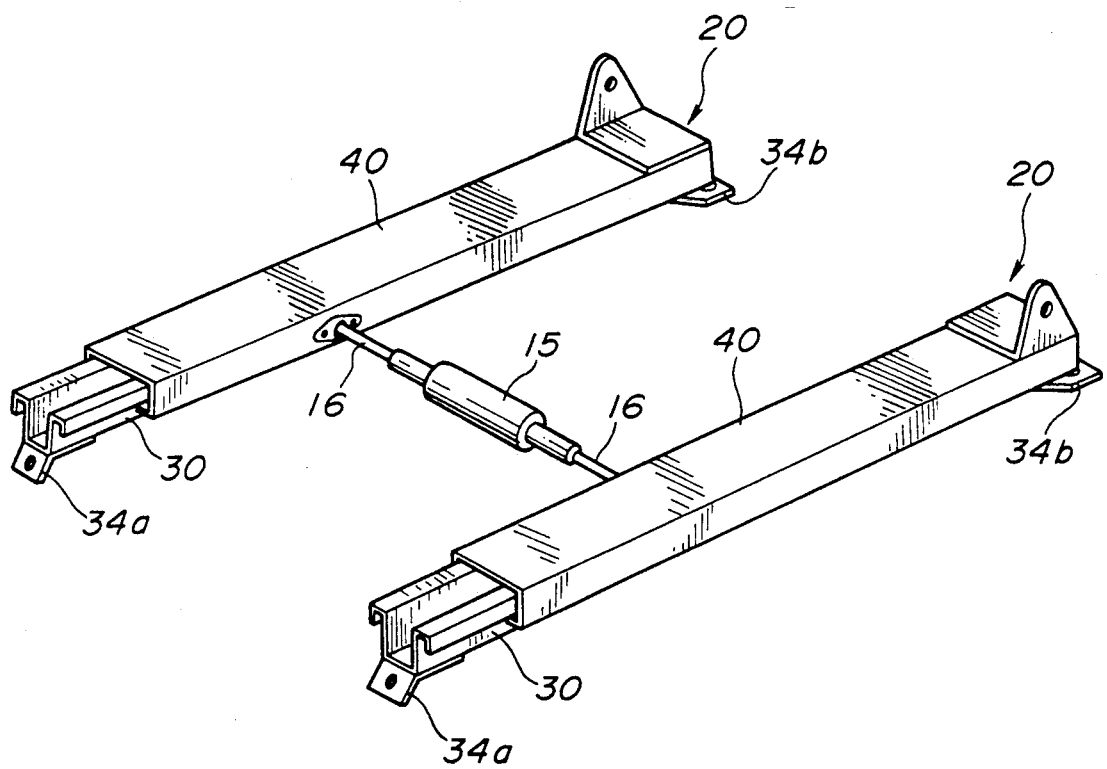
FIG. 3 is a perspective view illustrating one embodiment of a powered seat slide device according to the invention.

Referring now to the drawings, particularly to FIGS. 2 and 3, there is shown an automobile powered seat slide device through which a relative position of an automobile seat A to the floor panel of the vehicle body is electrically adjustable. As shown in FIG. 3, the powered seat slide device comprises a pair of telescopically extendable guide rail units 20 arranged in parallel with each other depending upon the width of the seat cushion. As seen in FIGS. 2 and 3, the two guide rail units 20 are respectively provided on both sides of the bottom surface of the seat A and in addition extend frontwardly and rearwardly of the seat. Each guide rail unit 20 is comprised of a lower stationary guide rail 30 rigidly mounted on the floor panel of the vehicle body through a front bracket 34a and a rear bracket 34b by means of fastening bolts (not shown) and an upper slidable guide rail 40 firmly secured onto the side portion of the bottom surface of the seat by means of fasteners, such as fastening bolts, rivets or the like, in a manner so as to reliably support the seat and also to be slidable in relation to the lower stationary guide rail 30. The upper and lower guide rails 40 and 30 are slidably fitted to each other. In FIG. 3, a drive motor 15, such as an electrically powered drive motor, is provided between the parallel guide rail units 20. Reference numeral 16 designates an output shaft outwardly extending from both ends of the drive motor 15.

Since the guide rail units 20 of the powered seat slide device according to the invention are substantially symmetrical, i.e., the right guide rail unit has substantially the same construction as the left guide rail unit, only one side of guide rail unit will be hereinafter described in detail for the purpose of the simplification of the disclosure.

Figure 4:
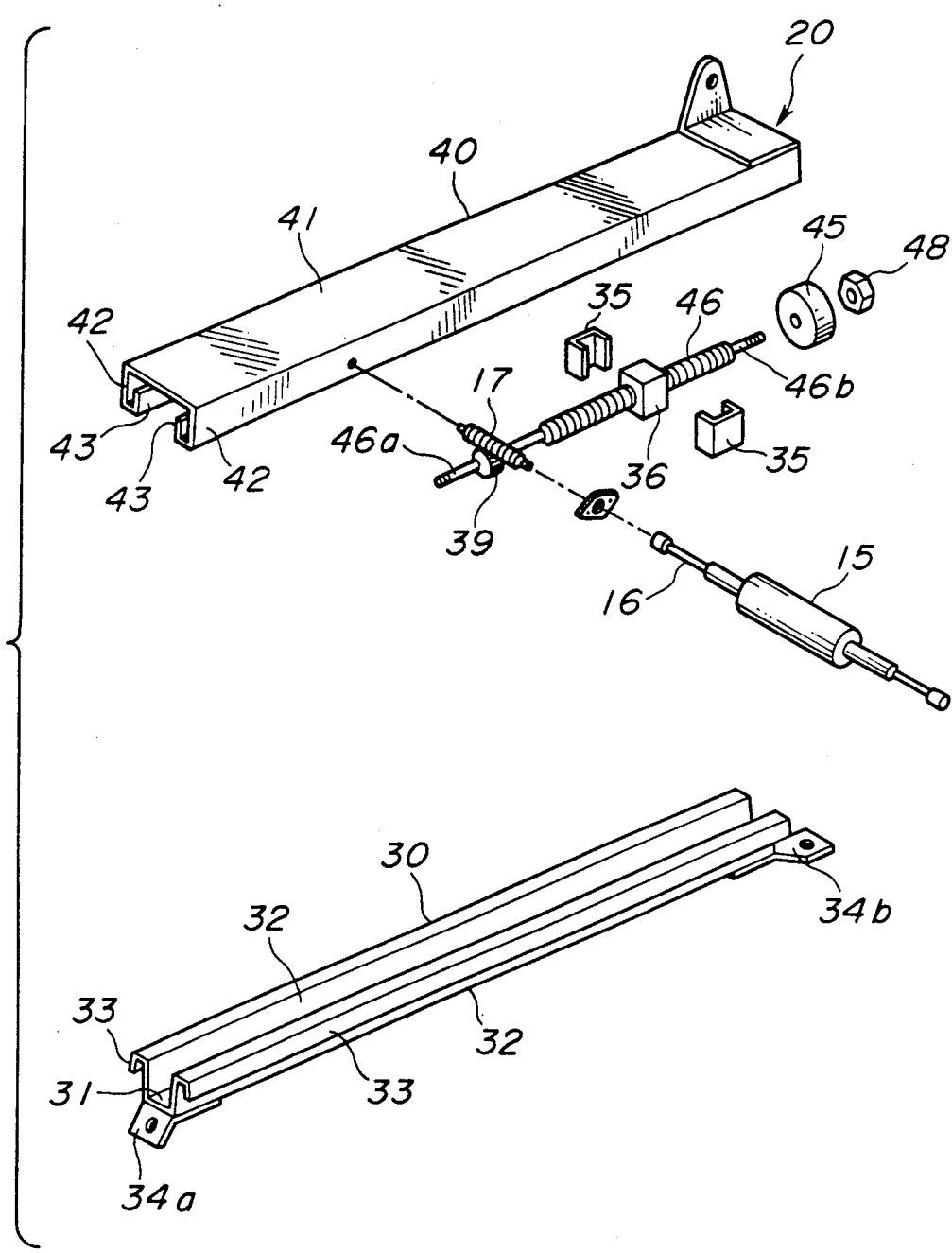
FIG. 4 is an exploded perspective view illustrating the powered seat slide device of the embodiment.
Figure 5:
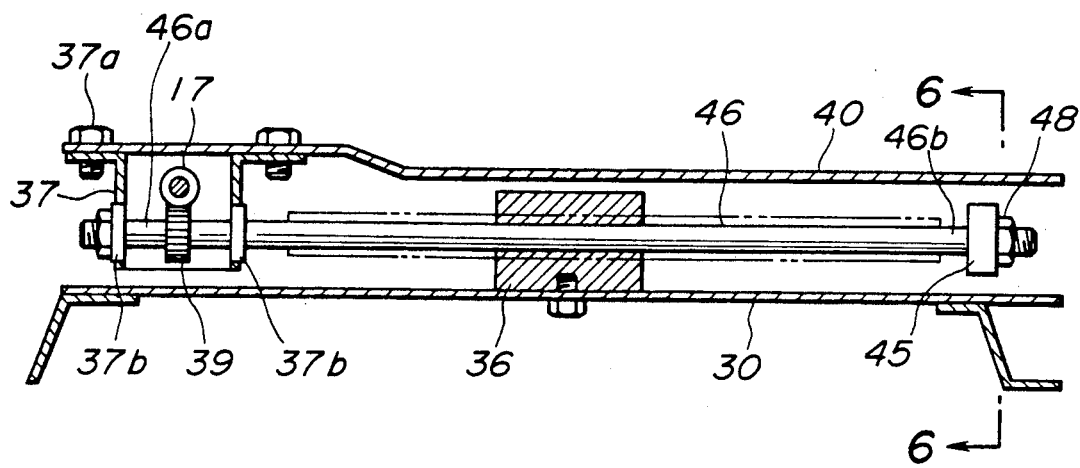
FIG. 5 is a longitudinal cross-sectional view illustrating the assembled powered seat slide device of the embodiment.

Referring now to FIG. 4, a reversed hat shaped, lower stationary guide rail 30 includes a bottom wall section 31 employing the brackets 34a and 34b at both ends thereof, a pair of side wall sections 32 each having a bent portion at its upper end, and a pair of upper curved flanges 33 each downwardly extending from the bent portion. On the other hand, the upper slidable guide rail 40 includes a substantially flat ceiling wall section 41, a pair of side wall sections 42 extending downwardly from the ceiling wall section 41, and a pair of upper curved flanges 43 each extending upwardly from the lower end of the side wall section 42. A nut member 36 is firmly fixed through a pair of C-shaped retainers 35 onto the bottom wall section 31. The lower stationary guide rail 30 is slidably fitted to the upper slidable guide rail 40, in such a manner that the upper curved flange 33 of the lower guide rail is slidably enclosed by the lower curved flange 43 of the upper guide rail. Although it is not clearly shown, a slider made of synthetic resin may be provided between the mating surface of the upper curved flange 33 and the mating surface of the lower curved flange 43, so as to insure a smooth sliding movement of the upper guide rail relative to the lower guide rail. A driving mechanism for the guide rail is also provided in an aperture defined between the slidably fitted pair of rails 30 and 40. As shown in FIGS. 4 and 5, the driving mechanism is comprised of the nut member 36, a screw-threaded shaft 46 screwed into the nut member 36 and extending in a longitudinal direction of the guide rail, and a gear box 37 accommodated in an internal space defined in a front end of the ceiling wall section 41 of the upper guide rail 40. The gear box 37 operably accommodates a worm 17, and a worm wheel 39 engaged with the worm 17. The input shaft of the worm 17 is rigidly connected to the output shaft 16 of the drive motor 15. As best seen in FIG. 5, the gear box 37 is firmly secured onto the ceiling wall section 41 by means of fasteners 37a, such as bolts. Returning to FIG. 4, the screw-threaded shaft 46 is comprised of front and rear male-screw ends, an intermediate male screw-threaded section screwed into the nut member 36, a front non-threaded section 46a extending between the front male-screw end and the intermediate male screw-threaded section, and a rear non-threaded section 46b extending between the rear male-screw end and the intermediate male screw-threaded section. As shown in FIG. 5, the front non-threaded section 46a is rotatably supported by a pair of bearings 37b attached to front and rear walls of the gear box 37. Although it is not clearly shown, the frontmost end of the screw-threaded shaft 46 is rigidly secured to the inner race of the front bearing 37b of the gear box in such a manner as to sandwich the inner race by a nut screwed into the front male-screw end and a stepped portion formed at the front end of the non-threaded section 46a. The worm wheel 39 is formed integral with the front non-threaded section 46a. Note that, the rear end of the screw-threaded shaft 46 is not supported rotatably by means of a bearing member mounted on the upper guide rail 40, in a conventional manner. That is, the rear end of the screw-threaded shaft 46 is constructed as a free end. As shown in FIGS. 4 and 5, a substantially cylindrical elastomeric member 45 is secured to the rearmost end of the rear non-threaded section 46b by means of a nut 48 screwed onto the rear male-screw end.

Figure 6:
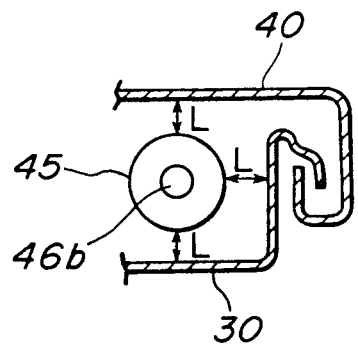
FIG. 6 is a lateral cross-sectional view taken along the line 6—6 of FIG. 5, showing a distance L defined between the rear end of the screw threaded shaft and the guide rail.

As shown in FIG. 6, it is preferable to arrange the rearmost free end of the screw-threaded shaft such that the respective distances L between the outer peripheral surface of the cylindrical member 45 and each inner wall surface of the upper guide rail 40 and the lower guide rail 30 are kept at a constant value, such as 3 mm through 8 mm. The previously noted proper arrangement of the cylindrical member 45 can effectively suppress fluttering of the rear free end of the screw-threaded shaft 46, during operation of the driving mechanism.

The powered seat slide device of the preferred embodiment operates as follows.

When the motor 15 is deactivated, the non-rotated worm 17 restricts the rotational movement of the worm wheel 39 and consequently the rotational movement of the screw-threaded shaft 46 is prevented. Under this condition, a relative sliding movement of the upper guide rail to the lower guide rail is prevented and the sliding movement of the seat A is prevented.

Conversely, when the motor 15 is activated, the worm 17 is rotated by the drive shaft 16 and simultaneously the worm wheel 39 is rotated with a relatively large reduction ratio. Thus, the screw-threaded shaft 46 is rotated to cause a relative displacement of the screw-threaded shaft to the nut member 36. As a result, the upper guide rail 40 attached to the seat A is moved with respect to the lower guide rail 30 attached to the floor panel of the vehicle body. In this manner, the seat A can be moved frontwardly and rearwardly through the driving mechanism, depending on the rotational directions of the drive motor 15. By switching the drive motor 15, the seat A can be positioned at a desired position.

As will be appreciated from the above, since the screw-threaded shaft 46 is rotatably supported at the front end 46a and the intermediate portion, but not supported at the rear end 46b, such a supporting structure can reduce the magnitude of load applied to the screw-threaded shaft 46, due to slight misalignment between the rotatably supported portions of the shaft 46. In other words, since the rear end of the screw-threaded shaft 46 is constructed as a free end, the non-supported rear free end of the shaft 46 provides a proper flexibility, thereby reducing the magnitude of undesirable load applied to the shaft 46. As a result, the aforementioned supporting structure for the screw-threaded shaft 46 also eliminates load applied to the drive motor 15 or the meshed portion between the worm 17 and the worm wheel 39. Consequently, the powered seat slide device having the above noted supporting structure for the screw-threaded shaft can reduce undesirable noise created during operation of the driving mechanism and prevent the drive motor 15 from being overloaded.

Furthermore, since the elastomeric member 45 is attached to the rear free end of the screw threaded shaft 46 in such a manner as to keep a predetermined distance between the inner wall of the guide rail and the outer peripheral surface of the elastomeric member, the elastomeric member 45 can effectively attenuate noise generated due to the interference between the rear end of the shaft 46 and the upper and/or lower guide rails 40 and 30. It is preferable that the substantially cylindrical elastomeric member 45 is coaxially arranged with the screw-threaded shaft 46, to achieve an exact dynamic balance of the shaft 46.

In addition, since the elastomeric or elastic member 45 having a predetermined proper mass serves as a balancer, such an elastomeric balancer 45 can effectively suppress flutter occurring at the rear free end of the shaft 46, during operation.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claimed is:

1. A powered seat slide device including at least one pair of guide rails slidably fitted to each other, for slidably supporting a seat such that the position of the seat relative to a floor is adjustable frontwardly and rearwardly, comprising:

a driving mechanism having a driven connection with a drive motor, for causing a relative sliding movement of one of said guide rails to the other;

said driving mechanism including a screw-threaded shaft rotatably mounted on one of said guide rails in an aperture defined between the slidably fitted pair of guide rails and a nut member engaged with said screw-threaded shaft and rigidly mounted on the other guide rail for rotation relative to said screw-threaded shaft;

one end of said screw-threaded shaft being rotatably supported by one of said guide rails, the other end of said screw-threaded shaft being a free end so as to permit a proper flexibility of said screw-threaded shaft; and an elastomeric mass attached to said free end of said screw-threaded shaft, for preventing a direct contact between said free end and an inner wall of at least one of said guide rails and for attenuating noise generated due to the interference between said free end and at least one of said guide rails;

wherein said elastomeric mass comprises a substantially cylindrical elastomeric member coaxially arranged with said screw-threaded shaft.

2. A powered seat slide device including at least one pair of guide rails slidably fitted to each other, for slidably supporting a seat such that the position of the seat relative to a floor is adjustable frontwardly and rearwardly, comprising:

a driving mechanism having a driven connection with a drive motor, for causing a relative sliding movement of one of said guide rails to the other;

said driving mechanism including a screw-threaded shaft rotatably mounted on one of said guide rails in an aperture defined between the slidably fitted pair of guide rails and a nut member engaged with said screw-threaded shaft and rigidly mounted on the other guide rail for rotation relative to said screw-threaded shaft;

one end of said screw-threaded shaft being rotatably supported by said one guide rial, the other end of said screw-threaded shaft being a free end so as to permit a proper flexibility of said screw-threaded shaft; and an elastomeric mass attached to said free end of said screw-threaded shaft, for preventing a direct contact between said free end and an inner wall of at least one of said guide rails and for attenuating noise generated due to the interference between said free end and at least one of said guide rails;

wherein said elastomeric mass comprises a substantially cylindrical elastomeric member coaxially arranged with said screw-threaded shaft, so as to achieve a predetermined acceptable dynamic balance of said screw-threaded shaft; and wherein said cylindrical elastomeric member is spaced apart from the inner wall surfaces of said slidably fitted pair of guide rails by a predetermined identical distance, each inner wall surface opposing to the outer peripheral surface of said cylindrical elastomeric member.

3. The powered seat slide device as set forth in claim 2, wherein said elastomeric mass is set to a predetermined weight mass to serve as a balancer for suppressing flutter of said free end of said screw-threaded shaft, during operation of said device.

* * * * *